Jan. 16, 1934.  G. G. EMERY ET AL  1,943,662
NEEDLE LOOM
Filed Jan. 2, 1932   6 Sheets-Sheet 1

INVENTORS.
George G. Emery.
Ralph W. Knowlton.
Harold C. Bennett.
BY
Henry L. Chenery.
Attorney

Jan. 16, 1934.　　　G. G. EMERY ET AL　　　1,943,662
NEEDLE LOOM
Filed Jan. 2, 1932　　　6 Sheets-Sheet 4

INVENTORS.
George G. Emery.
Ralph W. Knowlton.
Harold C. Bennett.
By Henry L. Chenery
Attorney Jan. 16, 1934.  G. G. EMERY ET AL  1,943,662
NEEDLE LOOM
Filed Jan. 2, 1932  6 Sheets-Sheet 6

INVENTORS.
George G. Emery,
Ralph W. Knowlton,
Harold C. Bennett.
BY Henry L. Chenery
Attorney.

Patented Jan. 16, 1934

1,943,662

UNITED STATES PATENT OFFICE 1,943,662

NEEDLE LOOM

George G. Emery, Sanford, and Ralph W. Knowlton and Harold C. Bennett, Westbrook, Maine, assignors to Sanford Mills, Sanford, Maine, a corporation Application January 2, 1932. Serial No. 584,424

8 Claims. (Cl. 139—21)

The invention hereinafter to be described relates, in general terms, to textile manufacturing apparatus, as for instance looms, but deals more particularly with a loom structure or equipment for looms in which the filler or weft thread is carried into the warp shed in the form of a single strand by means of a reciprocable, tubular element which we designate as a stock-carrying needle and which is disposed at one side of the weaving section and operates in conjunction with a thread-gripping needle located on the opposite side of the loom, the two needles moving in opposite directions and meeting substantially halfway across the shed. As the needles separate on their return movement the gripping needle draws the thread completely across the lay and deposits it in the shed, the thread being cut near the nose of the stock-carrying needle after the two needles have fully withdrawn from the shed.

The concept of the invention is entirely opposed to the conventional method in which shuttles and bobbins are employed in weaving processes, and also in contrast with so-called needle looms in which the thread is carried across the shed in loop form.

It will be perfectly obvious to those skilled in the art of weaving that a single set of these needles may be employed where it is necessary to use but a single strand of the filler thread in the weaving operation, but in our present invention we have elected to illustrate and describe it in connection with and its application to double weaving looms or those in which two single and separated strands of the weft thread are carried across the lay simultaneously by two sets of the tubular elements.

The object, of course, in employing two sets of these needles is to produce a double-back fabric which after being cut or split makes two distinct sheets of finished textile material each having a back or base portion and a pile texture on one face thereof.

One of the objections to the use of shuttles in weaving operations is the lack of thread capacity of the bobbins, this deficiency causing a material loss of time incident to the shut-downs or inoperating periods of the loom while changing shuttles is taking place.

Furthermore, a large supply of both shuttles and bobbins must be always available, involving a considerable investment, and repairs and replacements add further to the cost of operating shuttle-equipped looms. Moreover, this type of loom is extremely noisy in operation, a fault the avoidance of which is highly desirable according to conclusions reached by efficiency experts.

In the conception of our present invention we have sought to provide apparatus by which it will be possible to handle the more rapidly moving stock—the weft thread—to better advantage than can be accomplished by present-day methods.

The supply of weft material which is immediately drawn on in the process of weaving is not, in our arrangement, restricted to the very limited capacity of the bobbin used in shuttle looms. This thread is taken from a large spool of any capacity desired—one spool for each set of needles—and after this thread has been rove through the thread-carrying needle no further attention to this detail of providing a constant supply of weft material is required until the spool has been depleted of its thread.

Facilities are provided in our apparatus for holding the two weft threads in a position to be beaten up, the holding means being operative before the threads are released from the needles or are cut to the required lengths for filler threads.

There is also incorporated in the apparatus certain mechanism for procuring a selvage edge on both sides of the finished fabric, the mechanism being double—that is, it provides for a selvage edge on both the upper and lower backs, and on both edges of the double-back woven fabric.

The preferred embodiment of our invention contemplates the employment of two sets of reciprocating needles, the thread-carriers being positioned on the drive side and the thread-grippers on the cam side of the loom; this allocation, however, may be reversed and the respective sets of needles positioned in converse order.

We may elect, in certain instances—particularly where narrow fabric is to be woven—to change the above recited arrangement and adopt a method of handling the weft thread in which the thread-carrying needle is reciprocating and the thread gripping needle stationary. In this latter construction the actuation of the gripping jaws on the gripping needles would be accomplished by a cam action operating in timed relation to the movement of the thread-carrying needle; in all other respects the arrangement would be substantially similar to the one hereinbefore outlined.

The character of the invention may best be understood by reference to the description found in the following specification when taken in connection with the accompanying drawings disclosing an embodiment which, at the present time, we consider preferable to other possible forms in which the invention might be carried out.

In the drawings—

Similar reference characters are employed to identify like parts in all the different views of the drawings.

Figure 1:
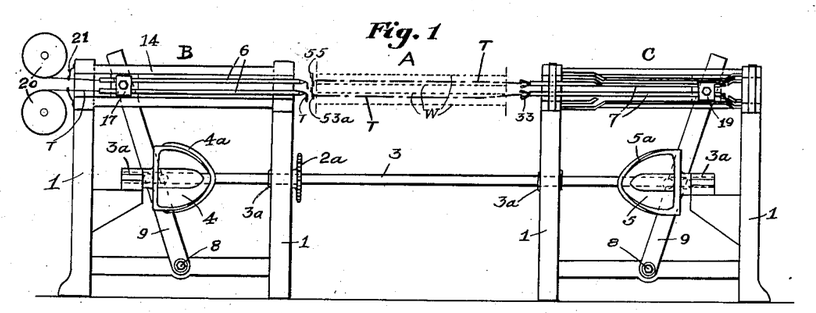
Fig. 1 is a diagrammatical end view of a loom showing in an abbreviated form the relative positions of the two sets of needles.

In Fig. 1 is shown, in a somewhat informal way, a simple diagrammatical view of a loom in end elevation depicting the main elements which enter into the construction of our shuttleless or needle loom, the two sets of thread-carrying and the two sets of thread-gripping needles being shown in each case in their retracted positions.

For the purpose of acquiring a more comprehensive understanding of the general import of our invention it might be well to consider the loom as divided into three sections, section A being that portion in which the actual weaving is accomplished, section B that in which are located the two needles which receive and carry the stock (weft thread) substantially half-way across the lay, (or through the sheds in section A), and section C that portion of the loom in which are housed, when not in action, the two needles which advance into section A simultaneously with the inward movement of the oppositely positioned needles, grasp the thread projecting from the ends of the latter and on their retractive movement draw the threads completely across the warp threads—or through the sheds which constitute the spaces between the layers of warp threads.

Figure 2:
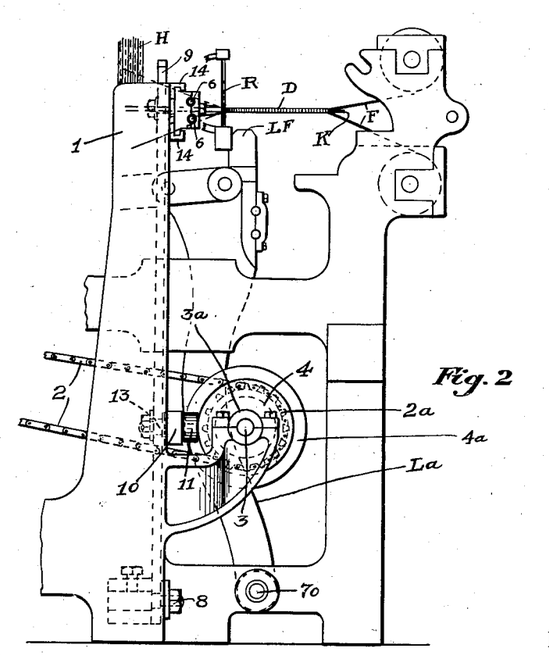
Fig. 2 is a side elevation of a portion of a loom showing particularly the positions of the needles with relation to that of the lay frame and associated parts of the loom.
Figure 2A:
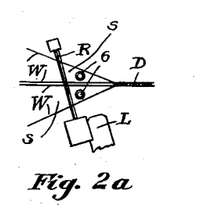
Figs. 2a and 2b are diagrammatical views showing different positions of the reeds with respect to the needles.

In Fig. 2, showing in part, only, the side of the loom, the lay frame is designated by the characters LF, the lay leg La, the sheds S, the reeds R, the harness H, the double thick fabric D, the slicer knife K, and the single sheets of finished material F. The positions of the needles when travelling through the sheds and the relative position of the reeds at this time are shown in Fig. 2a.

The frame structure or legs 1 support the elements which carry the needles and the parts which have to do with their actuation.

The power to operate the needles is derived from some source connected with the drive mechanism of the loom and is timed therewith, the interconnecting means preferably being a sprocket chain 2 operating over a sprocket wheel 2a. This effects rotation of the shaft 3 journalled in bearings 3a. On this shaft (3) are cams 4 and 5, of substantially similar construction, the former being employed in reciprocating the stock-carrying needles 6 and the latter the gripping-needles 7—these numerals, 6 and 7, identify the respective needles in their entirety.

If reference be had to Figs. 3, 5, 7 and 8 the structural features of the cam 4 and coöperating parts may be understood. The cam is of the series, barrel type but instead of employing a path, as is usual, a peripheral rim 4a is used, a somewhat abrupt turn at 4b being made for the purpose of effecting a quick reversal of movement of the needles after their limit of inward travel has been reached.

Pivotally connected at a point 8 on the substructure of the loom is a traveller arm 9 on which, at a point vertically abreast of the center line of the cam, is a swivelling roll-carrier 10. On this carrier are mounted two rolls revoluble on studs 12, the rolls engaging, respectively, the two sides of the rim 4a. The rearward side of the member 10 has a gudgeon 13 making pivotal connection with the traveller arm 9.

Reciprocably mounted in the slotted rails 14, which are fixed by bolts 15 to the tops of the columns 1, is a traveller 16 having lugs 16a operable in the slots 14a of the rails. The traveller has on its face two semi-circular grooves 16b which match corresponding, oppositely disposed grooves 17a in the cap member 17, forming circular holes in which the needles 6 are rigidly clamped by the bolt 19 to the traveller. Longitudinal adjustment of the needles in the traveller is thus provided.

Spools 20 on which a considerable quantity of the weft material is stored supply the thread T, constituting the filler or weft thread of the fabric, to the two needles 6, and guides 21 are provided to maintain alignment of the thread as it enters them.

Figures 9, 10, 11, 12, 13, 14, 15, 16, 17, 18:
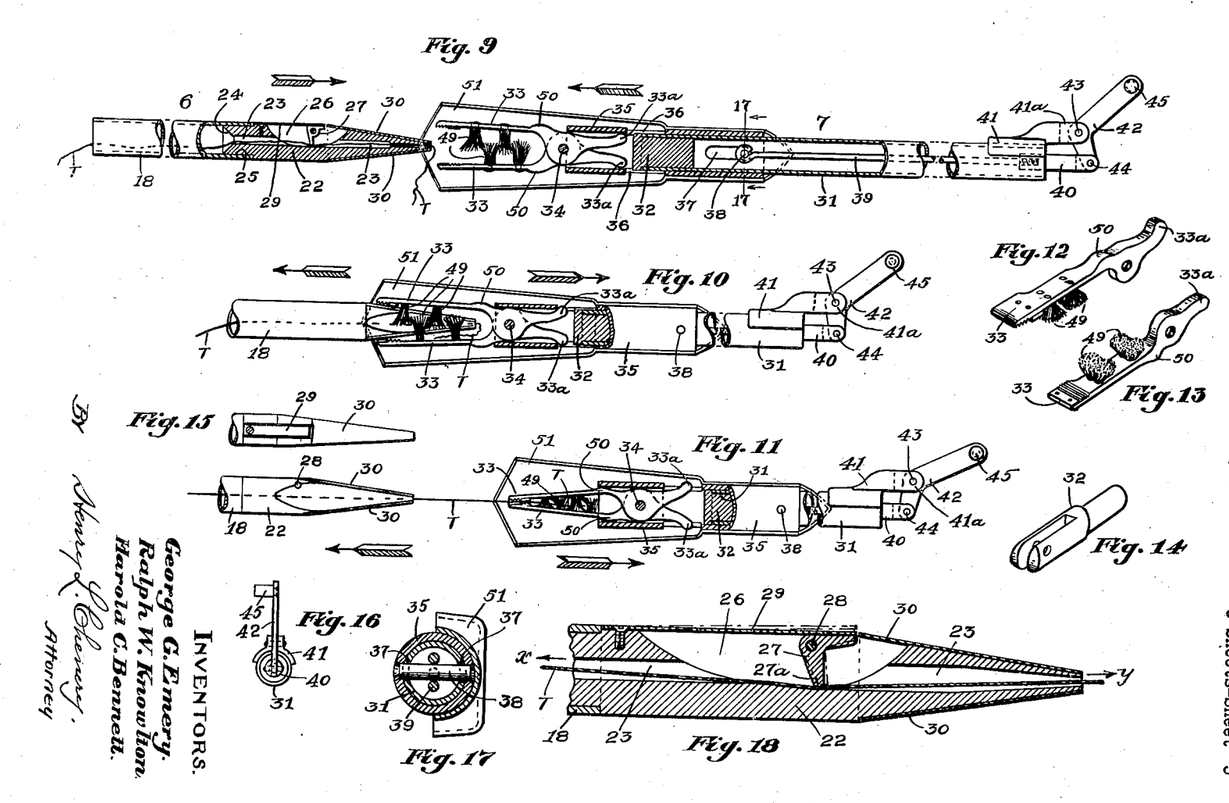
Fig. 9 is an elevation, partly in section, of a set of needles shown as they approach and are in near engagement.
Fig. 10 is a fragmentary view of the parts shown in Fig. 9, the jaws of the thread-gripping needle closing on the nose of the stock-carrying needle and each about to move on its return stroke.
Fig. 11 shows the needles separated—and still on their movements to positions shown in Fig. 1.
Fig. 12 and Fig. 13 show, respectively, the two members of the thread-straightening and gripping element.
Fig. 14 is a perspective view of the forked jaw-carrying plug.
Fig. 15 is a plan view of the nose end of the stock-carrying needle.
Fig. 16 is an outer end elevation of the gripping needle showing the bell-crank lever which actuates the gripping jaws.
Fig. 17 is a transverse sectional elevation of the gripping needle, the section being taken on line 17—17, Fig. 9.
Fig. 18 is a fragmentary sectional view of the stock-carrying needle, drawn to an enlarged scale.

Referring to Figs. 9 and 18, the thread-carrying needles 6 comprise a plain straight tube 18 on the operating end of which is a plug 22 through which is a hole 23. The inner end of the plug opening is flaring, as at 24, to facilitate the insertion of the thread at the start of weaving operations. The plug is reduced at 25 where it enters the tube 18, leaving the outside of the needle smooth and without shoulders.

Centrally of the length of the plug 22 a substantially semi-circular, longitudinal scarf 26 is made within which a bell crank element 27 operates. The lower leg 27a of the member 27 is in continuous contact with the thread T as it is drawn through the needle, the point of contact being set slightly in advance of the pivotal point 28 of the bell crank, producing a pinching action on the thread when tension tending to withdraw it from the needle in the direction of the arrow x is brought to bear on it.

The principal function exercised by the member 27 appears in connection with its duty of locking the thread T to the needle 6 as the latter advances into the shed, the pull on the thread as it is unwound from the spool causing a "dogging" action of the leg 27a tightly locking or binding the thread against the surface of the bore of the needle. When the opposite, or gripping needle grasps the thread the binding pressure is relaxed and the thread easily passes through the needle 6 in a direction indicated by the arrow y.

A spring 29 serves to maintain a constant strain on the horizontal portion of the bell crank 27 keeping the lower portion 27a in continuous contact with the thread.

For the purpose of procuring greater wearing and lasting qualities for the nose end of the needle 6 we preferably face the top and bottom surfaces of the flat, tapering end with hardened steel plates 30.

The thread-gripping needles are shown in Figs. 9, 10 and 11. They comprise a tubular member 31 on the operating end of which is secured a bifurcated plug 32. Between the forks of this plug operate two jaws 33 pivotally mounted on the pin 34. Figs. 12 and 13 depict these jaws in perspective view and it will be observed that rearwardly of their pivotal point each has an arm 33a, which operates somewhat after the manner of the handles on ordinary tongs.

Slidably positioned over the tube 31 is a sleeve 35 perforated by oppositely disposed slots 36; and extending through slots 37 in the sides of the tube 31 is a pin 38 fixed at each of its ends in the wall of the sleeve 35 (see Fig. 17).

Secured on the pin 38 and extending rearwardly within the tube 31 is a rod 39 having on its outer end a forked member 40. A bracket 41 is secured to the outer end of the member 31 and in an overhanging forked portion 41a is fulcrummed a bell-crank lever 42, pivotally mounted on the pin 43. The short arm of the bell-crank has pivotal connection with the member 40, at 44.

On the long arm of the bell-crank lever (42) is a laterally projecting stud 45 which, as will presently be explained, is operable in conjunction with other elements to transmit, relatively, longitudinal movement between the tube 31 and the sleeve 35.

Figures 19, 20, 22, 23, 24, 25:
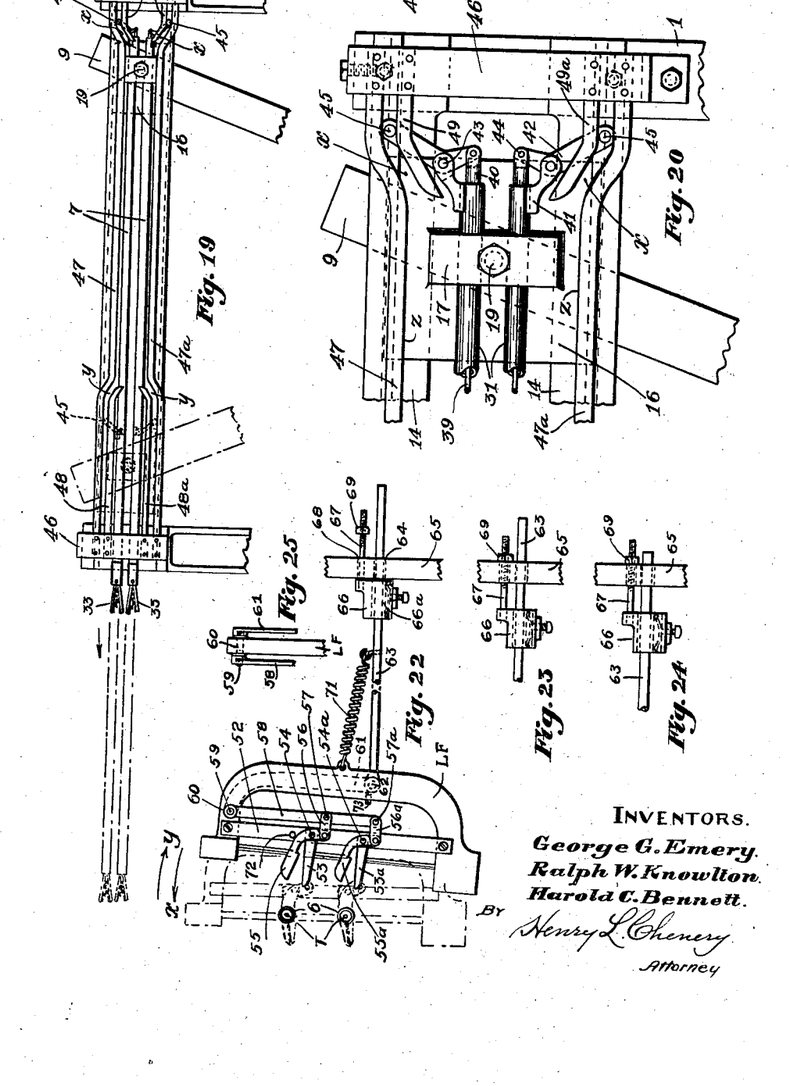
Fig. 19 is a fragmentary end view of the loom frame with the two gripping needles mounted thereon.
Fig. 20 is an elevation of a portion of Fig. 19, drawn to an enlarged scale.
Fig. 22 is a side elevation of the thread-clamping attachment mounted on the lay frame on the gripping-needle side of the loom.
Figs. 23 and 24, show, respectively, different positions of the rod which actuates the jaws for the thread-clamping attachment.
Fig. 25 is a detail showing in rear-end elevation the levers employed on the thread-clamping attachment.
Figure 21:
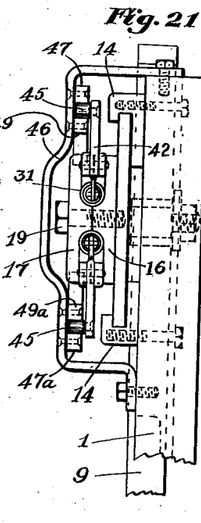
Fig. 21 is an end elevation of the parts shown in Fig. 20.

If reference be had to Figs. 19 and 20 it will be noted that the same general construction obtains with respect to the means employed to reciprocate the needles 7 as applies to the actuation of the needles 6—a similar cam, traveller arm, traveller and slotted rails. But in the case of the needles 7 there is required additional means to operate the gripping jaws 33.

To accomplish the actuation of these jaws we provide on each column 1 an overhanging cleat 46 and interconnect these cleats with two guide bars 47 and 47a. There are also supplied four short bars, 48, 48a, 49 and 49a which are secured, respectively, to the cleats 46.

As shown in Fig. 19 all of the bars are bent, either at locations x or y, the bars being disposed in vertically spaced relation, relatively, providing cam-ways into which and at the proper times the stud 45 is deflected as the needles 7 pass to and fro along the slotted rails 14.

The needles 7 are shown in Fig. 19 in full lines to represent them fully withdrawn from the sheds, their jaws 33 being open and the studs 45 disposed in their positions farthest removed from the axes lines of the respective needles. As the needles advance toward the center of the loom (see dot and dash lines, Fig. 19) through the action of the traveller arm 9, the studs 45 are drawn inwardly—toward the axes of the needles—and travel along in contact with the inner faces z of the two respective guide bars 47 and 47a. This has the effect of bringing the jaws closely together and this condition continues until the studs 45 are again deflected—this time outwardly—by the short guide bars 48 and 48a, causing the jaws to open again, as shown in Fig. 9. In this latter position of the jaws the needles, 6 and 7, are mutually approaching and in close proximity.

It will be observed that the stud 45 continues to move in a straight line along the cam path between the guide bars for a short space after reaching its extreme outward movement from the axis of the needle, causing a prolongation of the open-jaw period to permit the jaws to overlap the nose end of the needle 6, so that, when the needles separate, the bristles 49 may engage the thread T dangling from the end of needle 6 and on their return movement draw the strand out into a substantially straight line, enabling the jaws to more accurately grasp and hold it until the needle 7 has very nearly completed its full stroke, at which time the stud 45 is once more deflected—outwardly—through the cam path $x$, opening the jaws and releasing the thread. The above recital applies, of course, to both sets of needles as they act synchronously.

Fig. 9 shows the sleeve 35 engaging the rearward ends of the jaw extensions 33a, fully opening the jaws; Fig. 10 depicts the sleeve slightly advanced to permit the jaws to ride loosely the hardened steel faces of the nose of needle 6, and Fig. 11 illustrates the gripping needle 7 with its jaws tightly closed on the thread, this last action being accomplished by a still further advance of the sleeve on to the bumps 50 made on the outer faces of the jaws. A shield 51 assists in preventing entanglement of the warp threads W with the jaws of the needle 7.

After the two strands of weft thread T have been drawn completely across the lay, through the sheds, they require to be severed from the main supply being taken off the spools at a point a short distance from the nose ends of the needles 6, but before the cutting operation is performed and prior to their release from the needles these strands which are somewhat longer than the width of the fabric being woven must be temporarily secured and held on the lay-frame parts in order that they may be in proper order to be beaten up into the fabric. To accomplish the foregoing object we employ mechanism illustrated in Figs. 22, 23 and 24 of the drawings.

Secured in any convenient location on the lay frame, LF, is a bar 52 to which are fixed two jaws 53 and 53a, the latter comprising the lower members, respectively, of an upper and under thread-clamping device.

Pivotally mounted at points 54 and 54a are two oscillating jaws 55 and 55a, respectively, operating in association with these fixed jaws, 53 and 53a.

On extended portions of the jaws 55 and 55a are pivotally connected the links 56 and 56a, respectively, and joining the two links at pivotal points 57 and 57a is a lever 58 the upper end of which is secured on a shaft 59 operable in the bearing 60. Fixed also on the shaft 59, on the opposite side of the bearing 60, is another lever, 61, having at its lower end a forked connection, at 62, with the rod 63.

An opening 64 in a portion 65 of the loom frame is made to receive the rod 63 and mounted on the latter is a block 66 within which is a friction pad 66a adapted to provide, in conjunction with a stiff spring and set screw, a regulated resistance to the free passage of the rod 63 through the block. A stud 67 operating through the hole 68 in the loom frame extends rearwardly from the block 66, and a nut 69 on the stud serves to adjustably locate the block and limit its movement from the loom frame 65.

In operation the thread-clamping apparatus actuates as follows:

The lay frame oscillates from its pivotal point 70 in the sub-structure of the loom, and in its swinging movement in the direction of the arrow $x$ (see Fig. 22) the rod 63, with the block 66, advances with the lay frame until the nut 69 abuts on the frame 65 (see Fig. 23). No action, relatively, of the clamping-jaws has thus far taken place, the spring 71 making connection between the lay frame and the rod 63 acting to keep the jaws apart and the jaw 55 in strong contact with the stop-pin 72—which latter limits the opening of the two sets of jaws—the upper and under.

Upon continued forward travel of the lay frame the rod 63 and the pivot pin 62 in the lower connection of the lever 58 remain stationary, due to the frictional grip which the pad 66a in the block 66 exerts on the rod; the upper pivotal point of the lever, at 59, however swings forwardly with the lay frame and thus a relative movement between the lever and the frame takes place, causing the jaws 55 and 55a to start moving toward their mating jaws, 53 and 53a, respectively. This closing action continues until the lever 58 abuts on the stop pin 73, at which time the jaws have closed on the respective weft threads which have passed into the sheds through the agency of the needles 6 and 7.

As all the elements are now in rigid connection, a slight further movement to beat the weft thread into the fabric causes the rod to move forwardly through the block 66, overcoming the resistance offered by the pad 66a, the position of the rod, relative to the block being shown in Fig. 24, at which point the lay frame has fully completed its forward stroke.

On the return stroke of the lay frame, in the direction of the arrow $y$, the spring 71 being in strong tension acts with the interconnecting elements to immediately start to open the jaws, thus releasing the threads which have been beat up. The block 66 will shortly abut on the frame 65 and during the remainder of the backward movement of the lay frame the rod 63 will slide through the block against the frictional resistance of the pad until at the end of its stroke the parts resume their original position, as depicted in Fig. 22.

The weft thread-clamping mechanism is required on both sides of the loom but the thread-cutting attachment, obviously, is necessary only on the thread-carrying needle side thereof, and we have found it advantageous, both mechanically and operatively speaking, to combine the parts entering into the thread-clamping and thread-cutting device in a more or less unitary structure, locating this mechanism on the lay frame adjacent the inner end of the thread-carrying needle so that as the frame swings, the filler thread may be accurately engaged at the proper severing point in its length simultaneously with the engagement of its opposite, or free end, by the simple clamping affair just previously described and which was positioned on the thread-gripping side of the loom.

Figure 26:
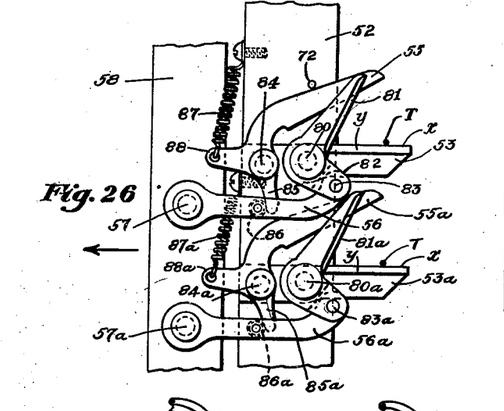
Fig. 26 is a side elevation of the combined thread-clamping and thread-cutting mechanism used on the stock-carrying needle side of the loom.
Figure 27:
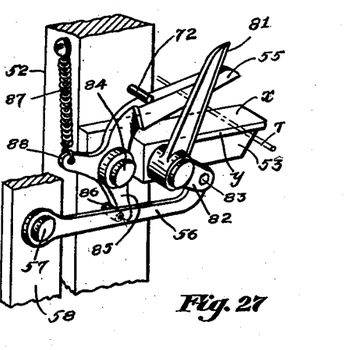
Fig. 27 illustrates in perspective one of the units shown in Fig. 26.

The means employed to actuate the combination clamping and cutting apparatus is substantially similar to that shown in Fig. 22 with respect to the lever 61, spring 71 rod 63 and block 66, and for this reason we have abbreviated the drawing by deleting these parts in Fig. 26 and Fig. 27 which, otherwise, illustrates the construction which we prefer to use for the purpose disclosed.

The lower or non-oscillating member of the combination, element 53, functions in a dual capacity as it serves both as the anvil or under jaw for the thread-clamping device and the lower blade for the cutting attachment—the top $x$ being the anvil and the edge $y$ the lower blade.

The oscillating clamping jaw 55 acts in the same manner as does the corresponding element in the first clamping device shown and described.

Pivotally mounted at 80 and adapted to swing into engagement with the edge $y$ of the member 53 is a shear or cutting blade 81 and extending from its pivotal point is a crank arm 82. Connecting with this arm on the pivot pin 83 is the link 56 the latter making pivotal connection with the lever 58 at 57.

Oscillatively mounted on the pin 84, rearwardly of the blade 81, is the upper jaw 55 of the thread-clamping device, the jaw operating laterally of the blade 81. This jaw element (55) has a depending arm 85 which engages a roll 86 revolubly secured on a pin projecting inwardly from the side of the link 56, the arm being held in yielding engagement with the roll by a spring 87 interconnecting the bar 52 and the horizontal arm 88 of the jaw.

It will be observed that the angle of inclination of the two arms, 82 and 85, are different, the arm 85 being nearer plumb than the other. The object of this construction is to permit the clamp jaw 55 to engage its mating jaw or anvil 53, at or on the surface $x$ in advance of the actual cutting of the filler thread by the mutual engagement of the thread-cutting blades 81 and 53, at $y$. The thread, T, therefore, is clamped on the lay frame parts prior to and during the cutting operation, and a space of time elapses in which the thread may be beaten up into the fabric before it is severed and finally released from the clamping jaws.

The jaw 55 can swing until it contacts with the surface $x$—and no further, but the movement of the blade 81 may continue after this, due to the extreme obliquity of the arm 82 and the fact that the jaw 55 is not positively connected to the link 56.

To more succinctly state the case, consider the lever 58 moving from the lay frame bar 52—in the direction of the arrow (Fig. 26) and drawing the link 56 forwardly. When the jaw 55 gets contact with the anvil 53, at $x$, the roll 86 will thereafter move away from the arm 85 leaving the latter freely suspended with the jaws "closed" by the action of the spring 87. The blades are at this time only partially drawn together, but on continued forward movement of the lever 58 and link 56 they will eventually have engaged the thread T, severing it.

The foregoing recital of the structural features of the combined thread-clamping and thread-cutting attachment would apply to a single unit of the elements, as for instance the embodiment illustrated in Fig. 27, applicable to a single loom; but as the present invention contemplates this equipment for a double loom the illustration depicted in Fig. 26 will more appropriately conform to the object of our invention. In the Fig. 26 we have designated each corresponding element in the upper and lower units by the same numeral, affixing the character "$a$" in each instance to the elements in the lower unit.

Figure 2B:
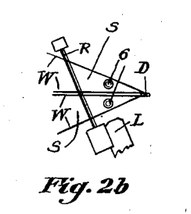
Figures 3, 4, 5, 6, 7, 8:
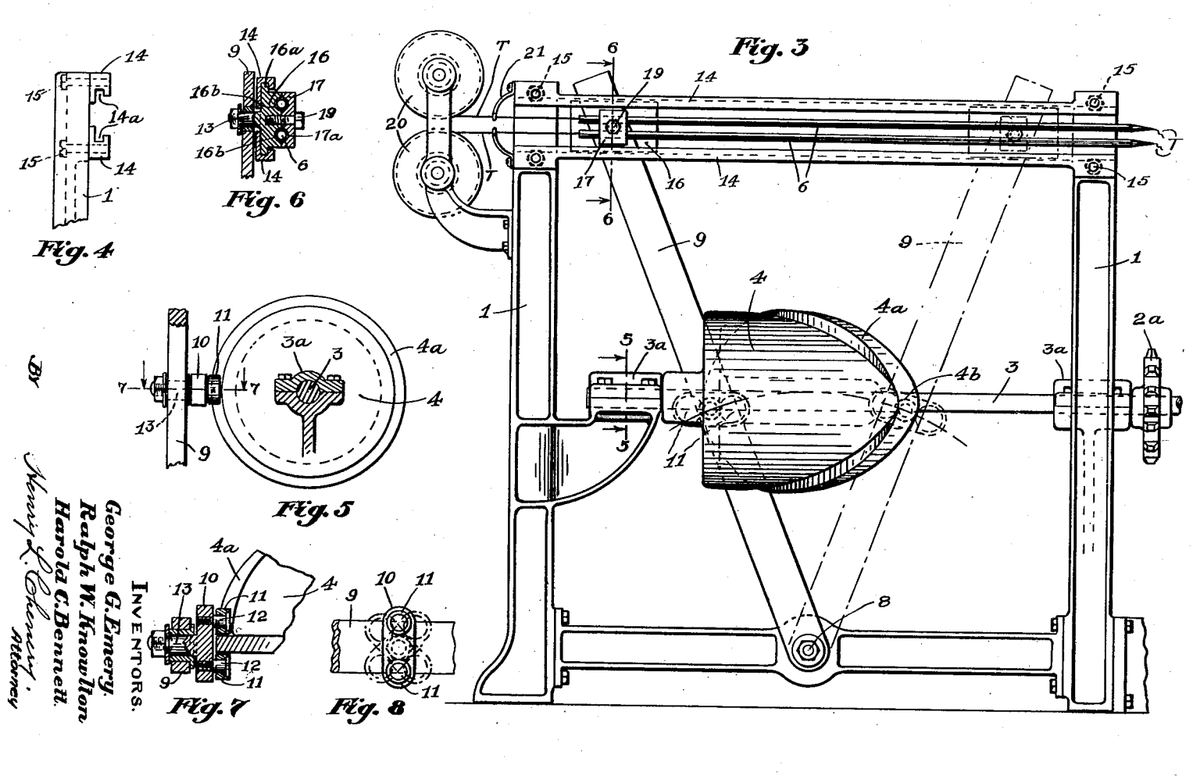
Fig. 3 is an elevation of the stock-carrying needle section of the loom, shown transversely thereof.
Fig. 4 is a detail showing the traveller rails.
Fig. 5 is an end view of the needle-actuating cam, the shaft and bearing for same being in section taken on line 5—5, Fig. 3.
Fig. 6 is a section taken on line 6—6, Fig. 3.
Fig. 7 is a section taken on line 7—7, Fig. 5.
Fig. 8 is an end view of Fig. 7, in part, showing particularly the rolls which engage the driving cam which actuates the needles.

Figs. 1, 2, 2a and 2b show the positions, relatively, of the needles, reeds and warp threads in different positions of the lay frame. In Fig. 2 the lay frame is in its extreme forward position, the reeds beating the cloth and the needles withdrawn from the sheds (see also Fig. 1); Fig. 2a shows it intermediate its extremes of movement, the reeds now being located rearwardly of the needles and the latter just about to enter the sheds S, while Fig. 2b illustrates the frame in its extreme rearward position, the needles 6 and 7 at this time meeting substantially half way across the sheds.

The needles must pass into and out of the sheds during the period of time in which the lay frame and reeds are moving from position shown in Fig. 2a to that shown in Fig. 2b and back again to the Fig. 2a position.

The thread-clamping operation is effected immediately the needles have withdrawn from the sheds S and continues until the weft threads have been beaten up into the cloth. The thread-cutting operation is performed just prior to the beat movement of the lay frame and before the threads have been released by the thread-clamping jaws.

Figures 28, 29:
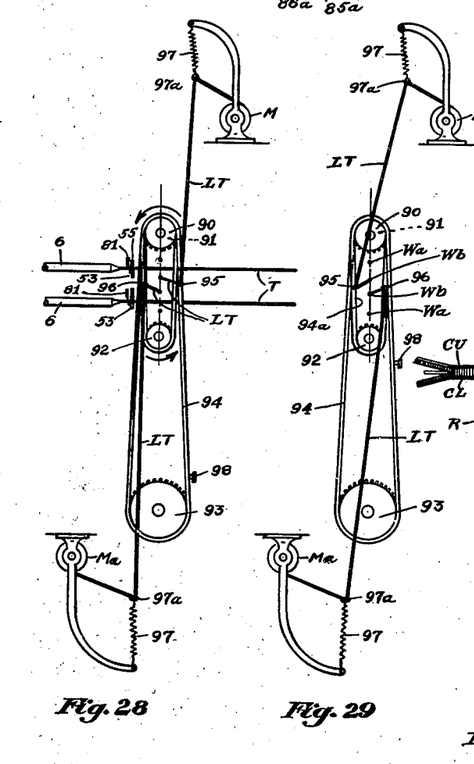
Figs. 28 and 29 illustrate the selvage-edge apparatus in front elevation, and show, respectively, two different positions of the locking-thread with respect to the warp threads.
Figure 30:
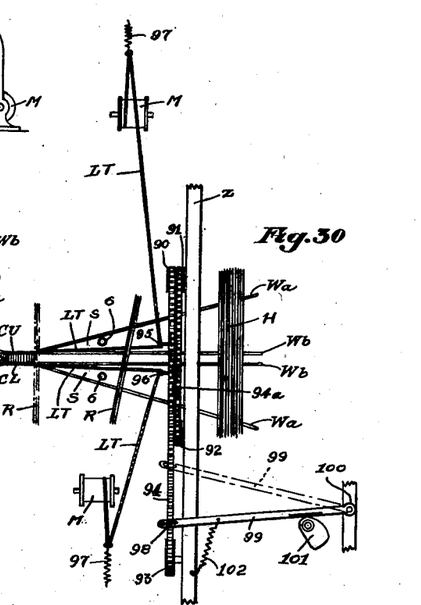
Fig. 30 is a side elevation of the selvage-edge mechanism.

It is quite essential in most lines of woven fabric to have the edges of the cloth selvaged, and for this purpose we have devised the apparatus illustrated in Figs. 28 to 30 inclusive.

As the loom in connection with which we have elected to disclose our invention is a double one, provision is required to be made to selvage both edges of the two backs of the double-woven fabric, involving four distinct selvage operations performed simultaneously.

In Figs. 28 and 29 are shown two views of the apparatus as viewed from the front of the loom and in a direction parallel with the warp threads of the fabric, the two views showing, respectively, the two positions of the locking thread as it is shifted from one to the opposite side of the vertical tier of warp threads.

Mounted on some available portion of the loom frame $z$ are four small sprocket wheels, 90, 91, 92 and 93. An endless sprocket chain 94 operates over these sprocket wheels, necessitating a slight disalignment of the chain as it passes over and interconnects wheels 90 and 92, and also between wheels 90 and 93.

The short loop of chain 94a encompasses the four outside strands of the warp threads Wa and Wb of both the upper and lower backs of the fabric being woven, and on opposite portions of this short section of chain are secured the eyelets 95 and 96, respectively.

Passing through each of the eyelets is a strand of locking thread LT, the eyelet 95 serving this thread to the upper back CU and the eyelet 96 to the lower back CL of the cloth.

The strands of the locking thread are drawn from supplies on the spools M and Ma, the former for the upper and the latter for the under back, and to keep these strands taut at all times during the shifting of the eyelets a spring 97 is provided, the strand passing through a loop 97a on the end of the spring.

On the long loop of the chain 94 a connection, at 98, is made with the lever 99, the latter being pivotally secured at its opposite end on the pin 100 fixed on any convenient portion of the loom frame.

The lever is raised by a cam 101 and depressed by a spring 102. This provides for alternate movements of the chain in opposite directions bringing, successively, the eyelets on to opposite sides of the vertical tier of warp threads Wa and Wb. For instance, in Fig. 28 the eyelet 95 is disposed on the right hand side of the view but in Fig. 29, the lever having been raised, it appears on the left hand side of the warp threads—and the opposite side of the short loop of chain.

In view of the fact that we are describing our selvage-edge-making apparatus in connection with the manufacture of double-back fabric, it is thought best to explain that in Figs. 28 and 29 we have portrayed the device in very simple and diagrammatical form but sufficiently intelligible, we believe, to convey a clear understanding of its import.

The two Figs. 28 and 29 show the outfit which will be used on each side of the loom, each of these outfits handling the selvaging of the edges of the two backs on one edge of the double-back fabric. The two outfits, therefore, perform four selvaging operations simultaneously on the cloth, each distinct from the others, and the elements involved in the process are so simple and few that the arrangement adds but slight expense to the loom equipment.

The short loop of the chain 94a serves to actuate the eyelets for both the upper and lower strands of locking thread and thus somewhat unifies the apparatus on each side of the loom.

When the lever 99 rises from the position shown in full to that shown in dot and dash lines (Fig. 30), the eyelet 95 moves upwardly and around the sprocket wheel 91 and simultaneously with this movement the eyelet 96 travels downwardly and around the sprocket wheel 92, each eyelet eventually occupying the position just previously vacated by the other. The movements of the eyelets are made in converse order when the lever falls, to resume its original position.

To gain a more comprehensive knowledge of the operative features of our selvaging mechanism attention is called to Figs. 31 to 35 inclusive, in which in order to avoid confusion in the drawings we have shown the two warp threads only which enter into the weaving of the upper back of the cloth, the corresponding lower thread elements being omitted as they are subject to the same treatment as are the upper ones. It will be observed, also, that the thread is represented on a greatly enlarged scale and separated to better illustrate the method of locking and interlacing.

Figure 31:
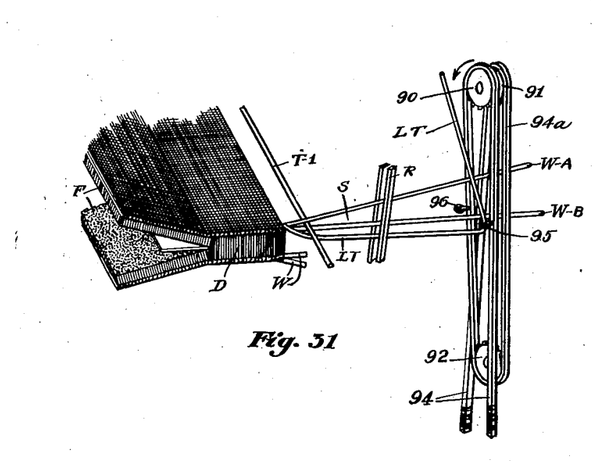
Figs. 31 to 35 inclusive show the various operations involved in locking the filler thread around the warp thread in the process of selvaging the edge of the fabric.

In Fig. 31 the filler or weft thread T—1 has been drawn through the shed S on the first "pick" of the needles, the locking thread LT lying beneath it. Upon movement of the sprocket chain in a direction indicated by the arrow the eyelet 95 passes over the top of the sprocket 90 to the position vacated by the eyelet 96 as the latter passes downwardly, and simultaneously, around the sprocket wheel 92 and then upwardly to the position just previously held by the eyelet 95 (see Fig. 32).

In this movement of the chain the eyelet 95 carries the locking thread LT from the outer to the inner side of the warp threads, bending the end of the weft thread T—1 around the warp thread W—A. At this point a second pick is made (see Fig. 33) bringing the weft thread T—2 through the shed.

Figure 34:
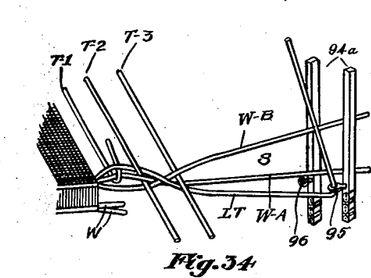

The harness (shown in Fig. 30) now shifts, changing, relatively, the positions of the warp threads W—A and W—B, and at the same time the eyelet 95 is carried back by the chain to its original position shown in Fig. 31, the locking thread returning to the outer side of the warp threads W—A and W—B, as shown in Fig. 34.

A third pick at this time brings in another filler thread T—3, leaving it disposed above the locking thread and in this instance beneath the warp thread W—B— the two picks just immediately preceding having left the filler threads beneath the warp thread W—A.

The eyelet 95 again passes to the inner side of the warp threads and the filler or weft thread T—3 is bent by the locking thread around the warp thread W—B, and immediately thereafter a fourth pick is made (see Fig. 35) depositing the weft thread T—4 beneath the warp thread W—A, at which juncture the harness again operates to shift positions of the warp threads— W—A now being above W—B.

Figure 35:
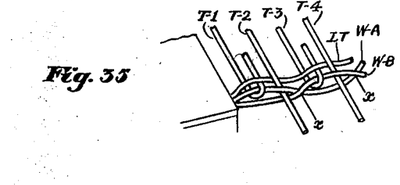

By observing Fig. 35 it is obvious that alternate weft threads only act as locking means for the warp threads the intervening weft threads passing straight through the edge of the fabric. It will also be noted that the weft threads which do the locking are, alternately bound around different warp threads, as for instance, the weft thread T—1 locks warp thread W—A, and weft thread T—3 serves in the same capacity with respect to warp thread W—B.

The eyelets carrying the locking thread LT change positions from one to the other side of the warp threads on every pick of the needles, but the harness shifts positions of the warp threads only after every two picks have been made, the crossing of the warp threads being shown at x, x, Fig. 35.

The positions, relatively, of the several elements entering into our loom operating structure are shown in abbreviated form in Figs. 28 and 30, these parts including the needles, thread-clamping and cutting devices and selvage-edge making apparatus.

It might be thought that more or less confusion exists in the arrangement of parts involved in operating the selvage edge apparatus in conjunction with the actuation of the thread-clamping and thread-cutting mechanisms.

As a matter of fact, however, we have equipped and have in actual operation a loom on which the foregoing operations are accomplished simultaneously and in harmony.

Figure 32:
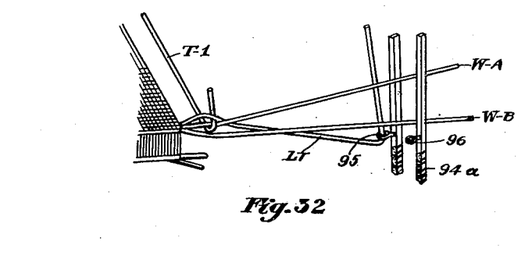
Figure 33:
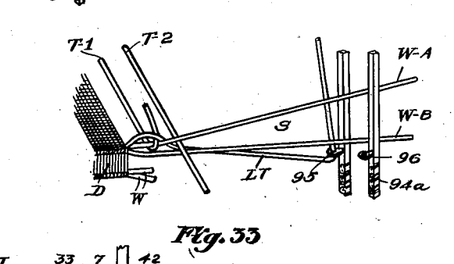

The locking thread LT and the two warp threads W—A and W—B operate in the same vertical slot in the reed R and the filler thread is held by the clamping jaws 53 and 55 until it has been beaten up into the cloth by the reed. Immediately upon the reed moving rearwardly on the return stroke of the lay frame, the jaws release the thread—after it has been cut—and thereafter the tension on the locking thread acts to draw up the free end of the filler thread and lift it over the warp thread in the form of a loop, substantially as shown in Figs. 31 and 32 of the drawings.

As has previously been stated, it is possible, and may be desirable in the manufacture of certain grades and widths of textile goods to employ a combination of weft thread carrying elements embodying one reciprocating needle for projecting the thread across the shed and a fixed thread-gripping element to hold it while the carrying element returns to its starting position.

Figure 36:
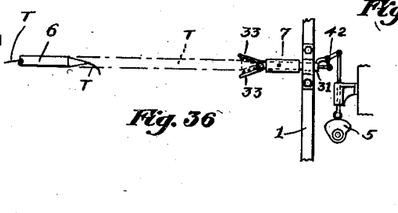
Fig. 36 depicts in a somewhat abbreviated manner a modified form of weft-carrying mechanism.

In Fig. 36 we illustrate in simple diagrammatical form such an arrangement, the thread-carrying needle being substantially similar to the one previously described, and the thread-gripping element having jaws actuated by a cam or other mechanical equivalent.

In this alternative design of needle filler-carrying mechanism the tube 31 is fixed in some portion 1 of the loom frame, and the cam 5 employed to actuate the jaws 33 for gripping the thread in a manner similar to that used on the previously described member 7. The length-wise immobility of this gripping needle is all that differentiates it from the reciprocating type.

We have hereinbefore used and will hereinafter employ the words "single strand", in referring to the filler thread, as implying or designating an element in the fabric structure which may be composed of either a single filament, or a plurality of filaments twisted or woven together to form a unitary cord or thread structure, the inference being that the filler element passes through the sheds in a single length—or strand as we term it, in contrast to a looped arrangement employed on some types of looms and in which, necessarily, there are two of these lengths.

From the foregoing description it is believed that a shuttleless or needle-type of loom constructed according to our invention is particularly well adapted for the purpose set forth, by reason of its simplified construction and the facilities with which it is provided for continuity of operation of the loom; and while we have illustrated and described what we now consider a preferred embodiment of the invention it is thought to be obvious that it is susceptible of more or less deviation from the exact mechanical structure disclosed, and for this reason we do not wish to be understood as limiting ourselves to the precise arrangement and formation of the several parts in carrying out our invention in practice except as hereinafter claimed.

What we claim is:

1. A loom comprising in combination with the lay frame therefor, a tubular needle, through the interior of which passes a single strand of weft thread, reciprocably disposed on one side of said loom, adjacent the warp shed thereof, a traveller to which said needle is adjustably secured, a traveller arm one end of which is pivotally secured to said traveller, a cam adapted to actuate said traveller arm whereby said needle may be moved into and out of the warp shed, means to automatically bind the weft thread in the interior of said needle against withdrawal therefrom while said needle is advancing through said warp shed and to release it upon the retractive movement of the needle, a thread-gripping needle disposed on the opposite side of said loom in axial alignment with the said first needle, thread-gripping jaws on said second needle, tufts of bristles extending from the inner faces of said jaws adapted, on the return stroke of the gripping needle, to straighten out and axially align the weft thread projecting out of the end of the first mentioned tubular needle prior to the gripping of the thread by said jaws, means to reciprocate said second needle simultaneously with the movement of said first needle, a clamp on each end of said lay frame adapted to close upon the weft thread while it is under tension between and connected to said needles, and means on said lay frame to sever the weft thread after it has been beat up into the cloth, the cutting being made adjacent the inner end of the first mentioned needle.

2. A shuttleless loom equipment comprising in combination with the lay frame for said loom, a weft-thread-carrying spool, two reciprocable needles operable in and out of the warp shed of the loom, one of said needles being arranged to carry the weft thread part way through, and the other needle to meet and grip the loose end of the weft thread protruding from the inner end of the first needle and draw it completely through the warp shed, means to actuate said needles, relatively, in opposite directions simultaneously, a weft thread clamping device mounted on each end of the said lay frame, and actuated thereby, said device comprising a jaw fixedly mounted on said lay frame, an oscillating jaw adapted to operate in conjunction with said fixed jaw, said jaws being so disposed on the frame that upon the forward oscillatory movement thereof the jaws will openly engage the weft thread under tension between the two said needles, and means whereby a delayed closing of the jaws on to the weft thread, with respect to the full oscillatory movement of the lay frame, may be had.

3. In weft-thread-handling apparatus for needle looms, comprising in combination with the lay frame for said loom, a weft-thread-carrying spool, two weft-thread-handling tubular elements disposed, respectively, on opposite sides of said loom, one of said elements starting and the other completing the movement of the weft thread through the warp shed, said needles moving in synchronism and in opposite directions, means on said lay frame to secure and hold said strand of weft thread while being beaten up into the cloth, a cutter adapted to sever the strand of weft thread from the main supply immediately after the beat movement of the lay frame, a locking thread disposed at the edge of the cloth being woven, and means to position the locking thread, in alternate beats of the cloth, on opposite sides, transversely of the loom, of the two outer warp threads of the cloth, whereby every alternate weft thread is bound around the warp threads to procure a selvage edge for the cloth.

4. A loom equipment comprising in combination with the lay frame for the loom, a spool on which may be wound a supply of weft thread, a reciprocable member adaptable of longitudinal movement through the warp shed and having a central bore into and through which may pass the weft thread as it is drawn from said spool, a thread-binding device in the bore of said member, said device comprising a bell-crank lever one leg of which is adapted to engage the weft thread and yieldingly hold it against longitudinal movement, relatively, in said bore while said reciprocable member is moving forwardly through the warp shed and to release the thread when said member is moving on its return stroke, a second member disposed on the opposite side of said loom, in axial alignment with said first member, thread-gripping jaws on said second member, cam-actuated mechanism to reciprocate said first member whereby on the termination of its inward stroke through said warp shed the end of the weft thread protruding from its bore, at its forward end, may be projected into the space between said jaws, and means to actuate said jaws whereby they may grip the weft thread and hold it during the return stroke of said first mentioned member.

5. In apparatus of the class described adapted for use on a double needle loom comprising in combination with the lay frame for said loom, two weft-thread-carrying spools, two weft-thread-carrying needles, relatively spaced and in vertical alignment, disposed on one side of said loom, two weft-thread gripping needles likewise spaced and disposed on the opposite side of the loom, the needles on both sides adapted to simultaneously enter the warp sheds and to meet substantially midway thereof, a double weft-thread-clamping device disposed on and at each end of said lay frame, said device comprising two fixed jaws, two oscillating jaws associated with said fixed jaws and operable to secure the weft threads after they have been carried through the warp sheds by the respective sets of needles and to hold said threads, under tension due to the strain thereon incident to their being drawn through the gripping needles, until they are beat up into the cloth, a thread-cutting device comprising a fixed cutting blade integral with each fixed clamping jaw in the clamping device on one side of the loom, only,—that on which is located the weft-thread-carrying needles, and two oscillating blades acting in coöperation with said fixed blades to form two shears adapted to sever the weft threads from the main supply immediately after the strands have been beaten up and prior to their release from the clamping jaws, a locking thread, and means, straddling the outer strands of the warp threads of the cloth being woven, to position said locking thread, alternately, on opposite sides, respectively, of said warp threads, whereby the ends of alternate weft threads may be bent around the warp threads at each alternate pick of the needles.

6. In a loom equipment comprising in combination with the lay frame for said loom, a weft-thread stock-carrying spool, a reciprocable tubular member adapted to receive the weft thread through its bore and carry it substantially half-way across the warp shed, a reciprocable tubular member disposed on the opposite side of the loom adapted to move into the shed simultaneously with the first mentioned member, to grip the weft thread and draw it completely across the warp threads, a weft thread clamping element on each end of the said lay frame adapted to bind the thread thereto until it has been beaten up, a cutter actuated by said lay frame for severing the weft thread from the main supply on said spool, adjacent the inner end of the first tubular member, prior to its release by said clamping elements, a selvaging apparatus adapted to lock alternate warp threads, comprising a locking thread the end of which is secured at the edge of the cloth at the start of weaving operations, a looped sprocket chain, the loop enclosing the two outer strands of the warp thread, sprocket wheels over which said chain operates, an eyelet, through which said locking thread is reeved, secured on one side of said loop of chain, a lever secured at one of its ends to said chain and making pivotal connection at the other with the frame of the loom, and means to actuate said lever whereby said eyelet may, alternately, be positioned on opposite sides, respectively, of the said two warp threads.

7. A weft thread-handling equipment for looms, comprising in combination with the lay frame therefor, a weft-thread stock-spool, two reciprocable, oppositely moving weft-thread-carrying needles adapted to cooperatively draw the weft thread from said spool completely through the shed of the loom, the said needles moving always in relative synchronism and meeting at the limits of their inward strokes substantially midway the width of the shed, means on each end of said lay frame to clamp the weft thread and, acting independently of said needles, maintain the thread under constant tension while being beaten up, and a cutter to sever each successive length of weft thread beaten up before being released from said clamping means.

8. A double needle loom for making double-back fabric comprising a weft-thread-carrying spool, a stock-carrying tubular needle disposed on one side of said loom, adapted to receive and pass through its interior the weft thread as it is fed off said spool, thread-locking means within said tubular needle, a thread-gripping needle disposed on the opposite side of said loom in axial alignment with said first mentioned needle, two thread-gripping jaws on and at the inner end of said gripping needle, thread-straightening bristles on the inner faces of said jaws, a rearwardly extending arm on each of said jaws, a sleeve operable over said arms and said jaws, means to actuate said sleeve whereby said jaws may, alternately, be opened and closed, guideways in which said needles may reciprocate, and means to reciprocate said needles in their respective guide-ways.

GEORGE G. EMERY.
RALPH W. KNOWLTON.
HAROLD C. BENNETT.